United States Patent
Blumrich et al.

(10) Patent No.: US 10,823,068 B2
(45) Date of Patent: Nov. 3, 2020

(54) HEAT EXCHANGER DEVICE FOR AN AIRCRAFT ENGINE

(71) Applicant: Rolls-Royce Deutschland Ltd & Co KG, Blankenfelde-Mahlow (DE)

(72) Inventors: Markus Blumrich, Berlin (DE); Michael Schacht, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 85 days.

(21) Appl. No.: 16/223,997

(22) Filed: Dec. 18, 2018

(65) Prior Publication Data

US 2019/0186362 A1 Jun. 20, 2019

(30) Foreign Application Priority Data

Dec. 20, 2017 (DE) .................. 10 2017 223 433

(51) Int. Cl.
| | | |
|---|---|---|
| F02C 7/14 | (2006.01) | |
| F28D 7/00 | (2006.01) | |
| F02C 7/18 | (2006.01) | |
| F02C 3/04 | (2006.01) | |
| F02K 3/06 | (2006.01) | |
| F02C 7/224 | (2006.01) | |
| F02C 7/12 | (2006.01) | |

(52) U.S. Cl.
CPC .................. *F02C 7/14* (2013.01); *F02C 3/04* (2013.01); *F02C 7/12* (2013.01); *F02C 7/18* (2013.01); *F02C 7/224* (2013.01); *F02K 3/06* (2013.01); *F28D 7/0066* (2013.01); *F05D 2220/323* (2013.01); *F05D 2260/213* (2013.01)

(58) Field of Classification Search
CPC ...................................... F02C 3/04; F02C 7/14

USPC ........................................................ 165/51
See application file for complete search history.

(56) References Cited

U.S. PATENT DOCUMENTS

| | | | |
|---|---|---|---|
| 2,731,239 A * | 1/1956 | Andersen | F01P 11/08 165/299 |
| 9,004,154 B2 | 4/2015 | Hagshenas et al. | |
| 2013/0219854 A1* | 8/2013 | Alecu | F02K 3/115 60/204 |
| 2016/0298547 A1 | 10/2016 | Ripley et al. | |
| 2017/0184028 A1* | 6/2017 | Sennoun | F02C 7/224 |

FOREIGN PATENT DOCUMENTS

| | | |
|---|---|---|
| EP | 2085599 A2 | 8/2009 |
| EP | 2085600 A2 | 8/2009 |
| GB | 2493291 A | 1/2013 |

OTHER PUBLICATIONS

German Search Report dated Aug. 31, 2018 for counterpart German Patent Application No. DE102017223433.4.
European Search Report dated Apr. 30, 2019 from counterpart European App No. 18211615.2.

* cited by examiner

*Primary Examiner* — Henry T Crenshaw
(74) *Attorney, Agent, or Firm* — Shuttleworth & Ingersoll, PLC; Timothy Klima

(57) ABSTRACT

A heat-exchanger device for an aircraft engine, having a fuel-oil heat exchanger for exchanging heat between fuel and oil, and a housing with an air inlet and an air outlet, wherein the fuel-oil heat exchanger is arranged at least partially within the housing such that air flowing from the air inlet to the air outlet can flow over or around the fuel-oil heat exchanger. The invention further relates to a method for operating an aircraft engine.

12 Claims, 11 Drawing Sheets

HEAT EXCHANGER DEVICE FOR AN AIRCRAFT ENGINE

Figure 1:
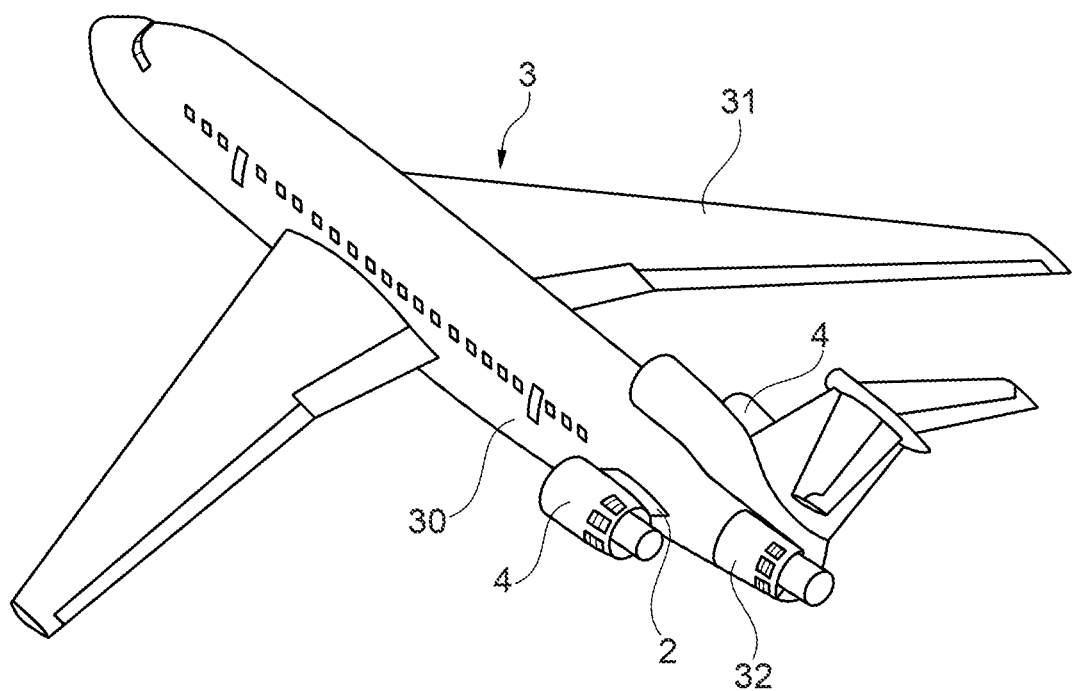

This application claims priority to German Patent Application DE102017223433.4 filed Dec. 20, 2017, the entirety of which is incorporated by reference herein.

DESCRIPTION

The invention relates to a heat-exchanger device for an aircraft engine, to a system having a heat-exchanger device of this type, and to a method for operating an aircraft engine as disclosed herein.

A multiplicity of separate heat exchangers are usually used for the heat management of aircraft engines and aircraft, in order to regulate the respective fluid temperature in an oil circuit, in a fuel supply system, in a bleed air system, an air conditioning oil circuit, etc.

Here, the individual heat exchangers are as a rule in each case independent units which are arranged at different locations, with the result that long and complicated line connections are often necessary to provide and discharge the respective fluids, in particular oil, fuel and air. The correspondingly large number of pipe and hose connections leads to a high weight of the overall heat management system and high manufacturing complexity with corresponding costs. In addition, the maintenance of systems of this type is complex. Furthermore, a great number of line connections can impair the accessibility of other components of the engine or the aircraft. Some heat exchangers are often also used only in certain phases of the operation of the aircraft engine and otherwise represent ballast during the flight.

U.S. Pat. No. 9,004,154 B2 describes a device which is divided into two sections with a combination of a fuel-oil heat exchanger in one section and an air-oil heat exchanger in the other section. This leads to a complex construction which additionally makes the arrangement of a bypass valve between the oil circuits of the two sections necessary. In addition, this device is suitable only for certain applications.

US 2017/0184028 A1 describes a heat-exchanger arrangement with fuel flow paths and oil flow paths, the heat-exchanger arrangement being arranged in a bypass channel or auxiliary flow channel of a turbofan engine and thus being cooled by the auxiliary air flow of the engine. The auxiliary air flow serves to drive the aircraft, however, and is not adjustable for the heat-exchanger arrangement which therefore cannot be operated in an optimum manner in many situations. In addition, the arrangement in the auxiliary flow channel is suitable only in certain embodiments of aircraft engines.

The object is to improve the heat exchange between fuel, oil and air, in particular in the case of an aircraft engine.

The object is achieved by way of a heat-exchanger device for an aircraft engine for exchanging heat between fuel, oil and air as disclosed herein.

Thereafter, a heat-exchanger device comprises a fuel-oil heat exchanger for exchanging heat between fuel and oil for the aircraft engine, and a housing. The housing comprises an air inlet and an air outlet. The fuel-oil heat exchanger is arranged (at least partially) in the interior of the housing, with the result that air flowing from the air inlet to the air outlet of the housing can flow over or around the fuel-oil heat exchanger, with the result that heat can be exchanged between the fuel-oil heat exchanger and the flowing air.

Heat can be exchanged particularly efficiently between the three media of air, oil and fuel by means of a heat-exchanger device of this type. The air flow through the air inlet can be controlled in a particularly satisfactory manner. In addition, a heat-exchanger device of this type can be of particularly compact configuration. The combination of the three fluids in one device allows a plurality of separate heat exchangers to be replaced at the same time, which makes it possible to use line connections which are substantially shorter overall. As a result of the fuel-oil heat exchanger being flowed over or around, large quantities of air can be guided through the heat-exchanger device in a short time, which makes particularly effective operation possible. The fuel-oil heat exchanger is preferably per se an assembly which can be pretested and/or is preassembled and is inserted, for example, into the housing.

In one refinement, the fuel-oil heat exchanger is arranged between the air inlet and the air outlet. This makes a particularly simple construction and an efficient exchange of heat and, in particular, efficient flowing of air over or around the fuel-oil heat exchanger possible. The arrangement of the fuel-oil heat exchanger in the interior of the housing therefore configures an air cooler.

The fuel-oil heat exchanger comprises, in particular, an oil flow path arrangement for connecting to an oil system of the aircraft engine, and a fuel flow path arrangement for connecting to a fuel system of the aircraft engine. In particular, the fuel-oil heat exchanger is a fuel-cooled oil cooler (FCOC for short). The oil flow path arrangement and the fuel flow path arrangement can configure a cooler matrix.

Heat can be exchanged between oil which flows through the oil flow path arrangement and fuel which flows through the fuel flow path arrangement. In particular, the fuel can cool the oil.

The air inlet is connected to the air outlet, in particular by way of an air flow path arrangement. The air flow path arrangement surrounds the oil flow path arrangement (at least partially), with the result that heat can be exchanged between air which flows through the air flow path arrangement and oil which flows through the oil flow path arrangement. A particularly efficient exchange of heat is possible as a result.

As an alternative or in addition, the oil flow path arrangement surrounds the fuel flow path arrangement (at least partially). In one development, at least one section of the air flow path arrangement is separated from at least one section of the fuel flow path arrangement by way of at least one section of the oil flow path arrangement. A construction with the fuel flow path arrangement as an inner core which is surrounded by the oil flow path arrangement which is in turn surrounded by way of the air flow path arrangement makes particularly efficient temperature control of the oil by way of the fuel and/or the air possible.

The fuel-oil heat exchanger can comprise a heat exchanger housing, in which, in particular, the oil flow path arrangement and the fuel flow path arrangement are accommodated. The heat exchanger housing is a housing; the designation heat exchanger housing serves to make a distinction in a simplified manner from the (outer) housing of the overall heat-exchanger device. The heat exchanger housing can be arranged at least partially, in particular predominantly or completely, within the housing, and, in particular, air flowing from the air inlet to the air outlet can flow over or around it. This makes a particularly simple and robust construction of the heat-exchanger device possible.

In one refinement, the fuel-oil heat exchanger comprises cooling fins, around which air flowing from the air inlet to the air outlet can flow, which cooling fins project, in particular, from the heat exchanger housing. A particularly simple and efficient exchange of heat is possible as a result.

The cooling fins optionally project from the heat exchanger housing in a star-shaped manner.

The heat-exchanger device can comprise one valve or a plurality of valves for controlling, in particular regulating an air flow through the air inlet. At least one feed line which is connected to the air inlet can be opened, partially opened or closed by way of the valve. As a result, the heat-exchanger device can control, in particular regulate the temperature of the oil and optionally of the fuel in a respectively optimized way in different operating states of the aircraft engine.

An optional control system controls (in particular, regulates) the one valve or the plurality of valves in a manner which is dependent on a temperature of the oil and/or in a manner which is dependent on a temperature of the fuel and/or the air. For control and/or regulation, the heat-exchanger device optionally has one or more temperature sensors which are operatively connected to the control system, for example in each case one or at least one correspondingly arranged temperature sensor for an oil temperature, a fuel temperature and an air temperature.

In accordance with one aspect, a system for an aircraft engine is provided, comprising an engine pylon which is configured for fastening the aircraft engine to an aircraft, in particular to a wing or a fuselage of the aircraft. The system comprises a heat-exchanger device in accordance with any desired refinement which is described herein. Here, the heat-exchanger device is arranged on or in the engine pylon, in particular is fastened to the engine pylon. A particularly space-saving arrangement and optimized line connections are made possible as a result.

In accordance with a further aspect, a system for an aircraft engine is provided, comprising an air turbine starter which is configured for starting the aircraft engine, or generally a compressed air source and/or hot air source. The system comprises a heat-exchanger device in accordance with any desired refinement which is described herein. Here, the air inlet of the heat-exchanger device is connected to an air outlet of the air turbine starter. The air turbine starter ejects hot air at its air outlet during starting of the aircraft engine. Said hot air can therefore be used to heat the oil. The oil which is usually cold and viscous during cold starting of the aircraft engine can therefore be made more capable of flowing. It is possible as a result to reduce the oil pressure. This can simplify the requirements of components of the oil system and can have a positive effect on the service life of the oil system and the bearings which are lubricated by means of the oil. In addition, it is possible to shorten the warm-up phase of the aircraft engine. The air turbine starter comprises, for example, a turbine which is driven or can be driven by way of an air flow, for example by an auxiliary engine, which turbine is coupled via an auxiliary transmission (also called an "accessory gearbox", AGB for short) to a shaft of the aircraft engine, in particular a high pressure shaft which supports and/or drives a high pressure compressor.

The system can comprise one or more valves which can be controlled, in particular can be regulated, in order to selectively guide (in particular, warm) air from the air outlet of the air turbine starter or (in particular, cold) external air, that is to say ambient air, to the air inlet of the heat-exchanger device. As a result, the heat-exchanger device can heat or cool the oil according to need.

The object is also achieved by way of a method for operating an aircraft engine as disclosed herein. Here, oil and fuel is provided to the aircraft engine by means of a heat-exchanger device in accordance with any desired refinement which is described herein. With regard to the advantages of the method, reference is made to the above advantages in respect of the heat-exchanger device.

In the method, one or more valves of the heat-exchanger device can be controlled in such a way that, in a cold-starting phase of the aircraft engine, (warm) air is guided from an air outlet of an air turbine starter of the aircraft engine to the air inlet of the heat-exchanger device, in order to heat the oil, and, during a warm-up operating phase of the aircraft engine, (cold) external air is guided to the air inlet of the heat-exchanger device, in order to cool the oil. In this way, depending on the operating phase of the aircraft engine, an optimized heat exchanging effect can be achieved, in order to improve the performance and/or the service life of the aircraft engine.

Figure 2:
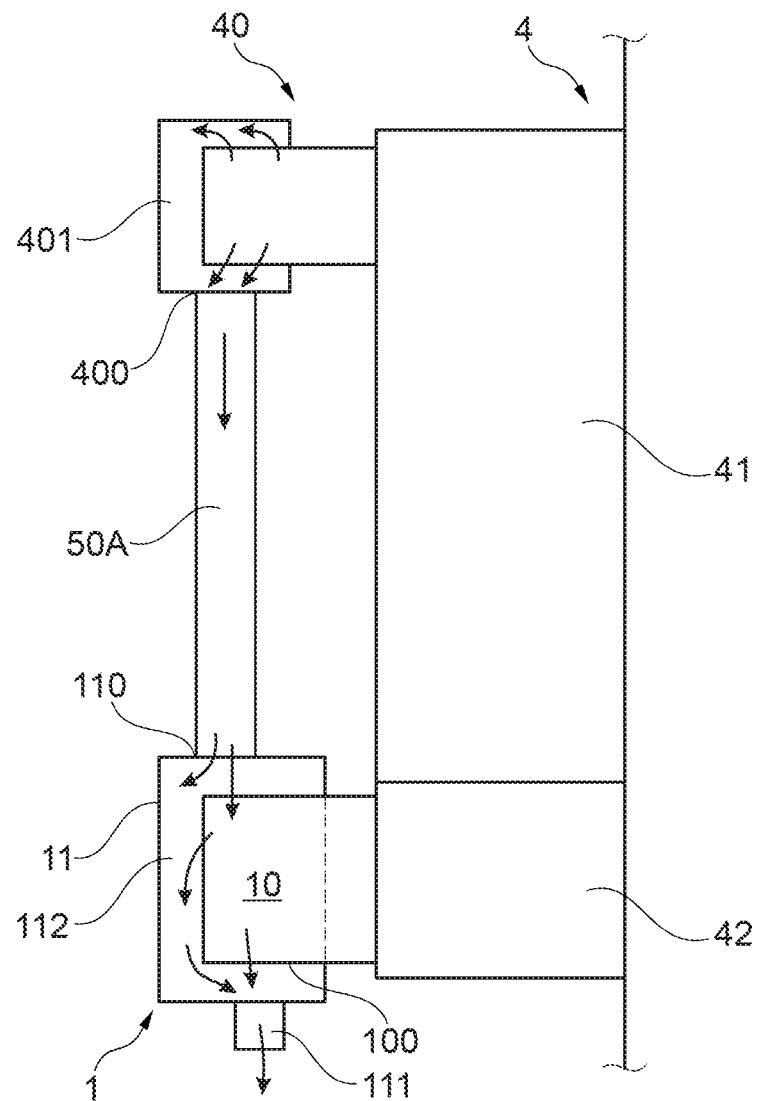
Figure 3:
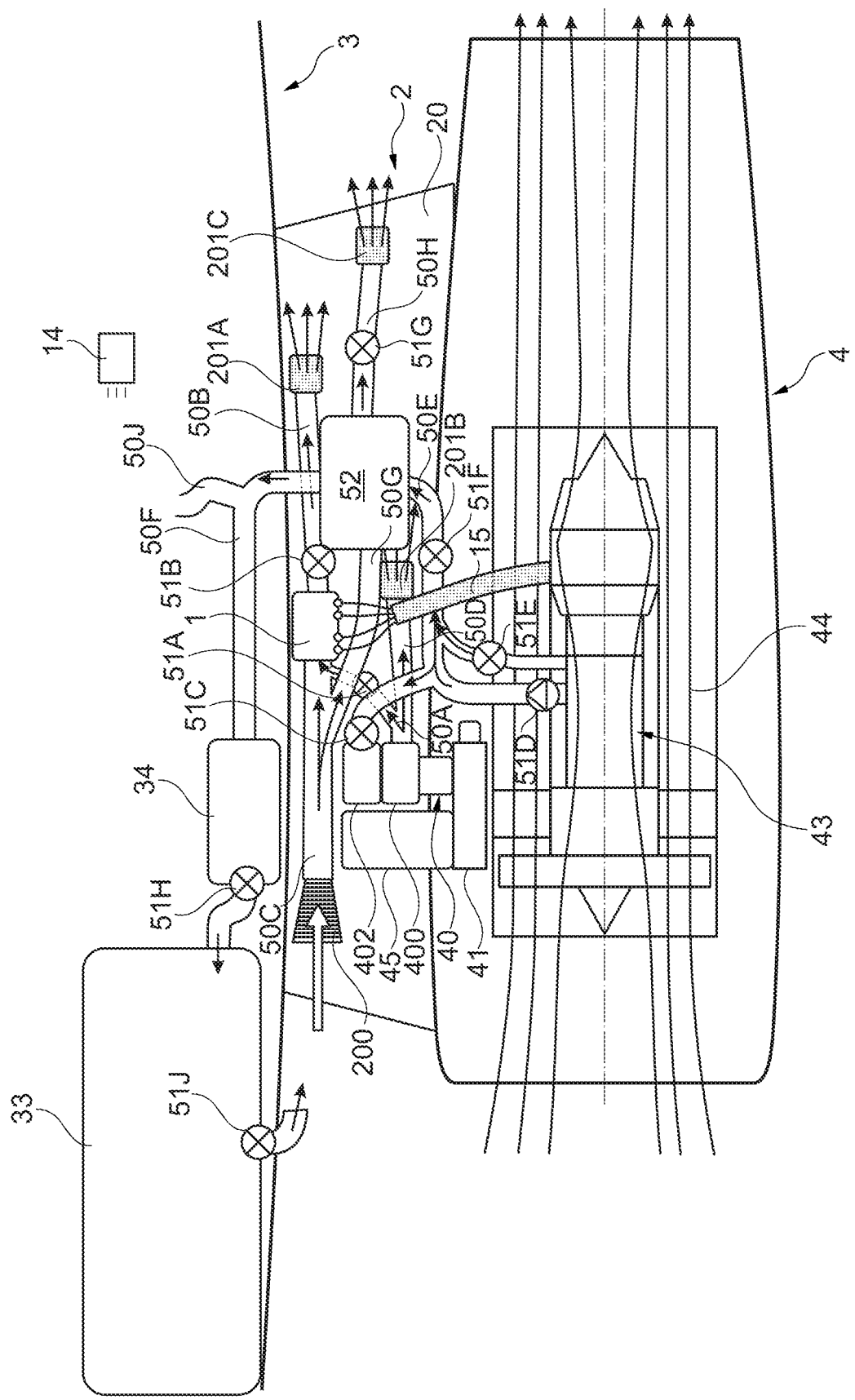
Figure 4:
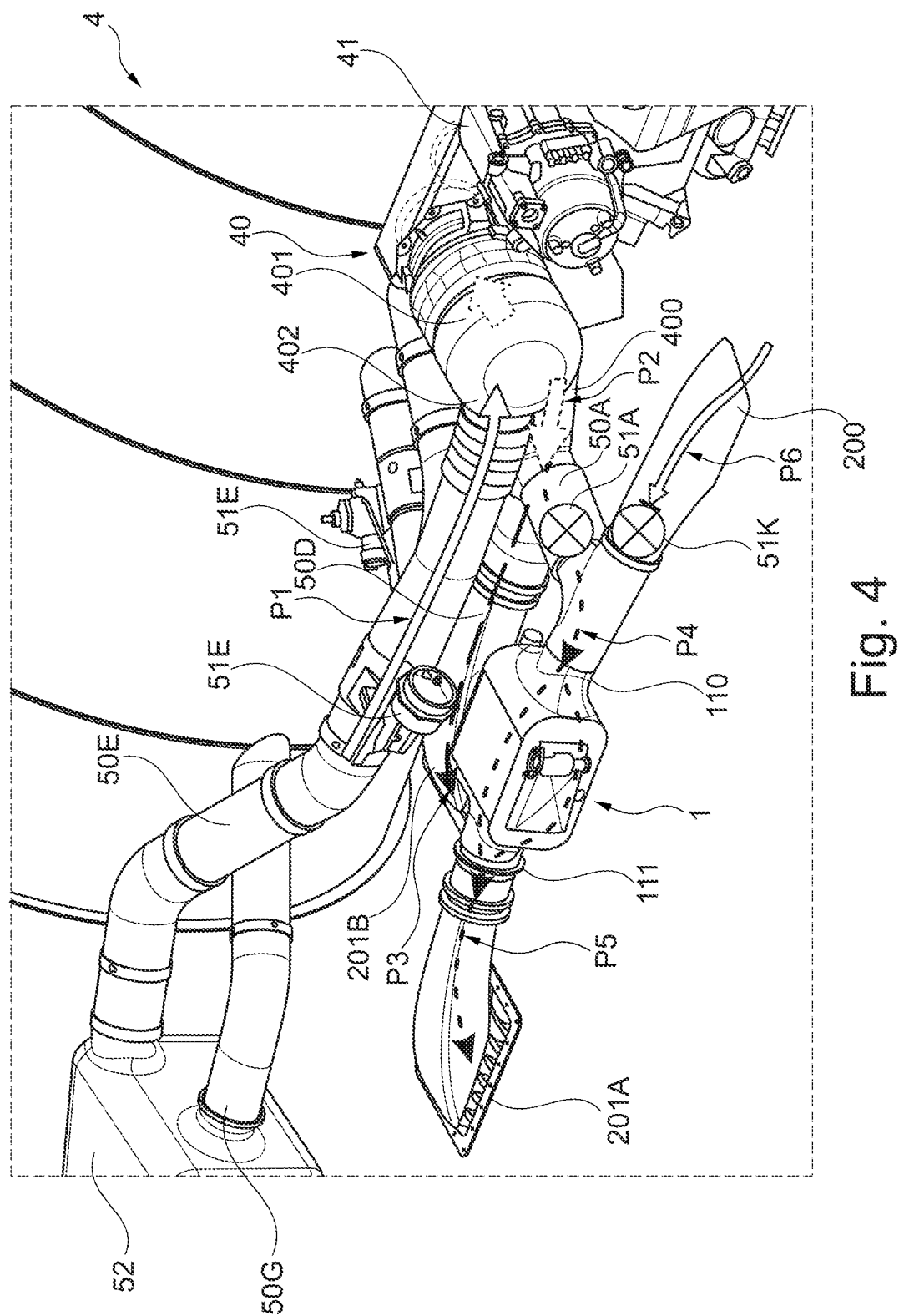
Figure 5:
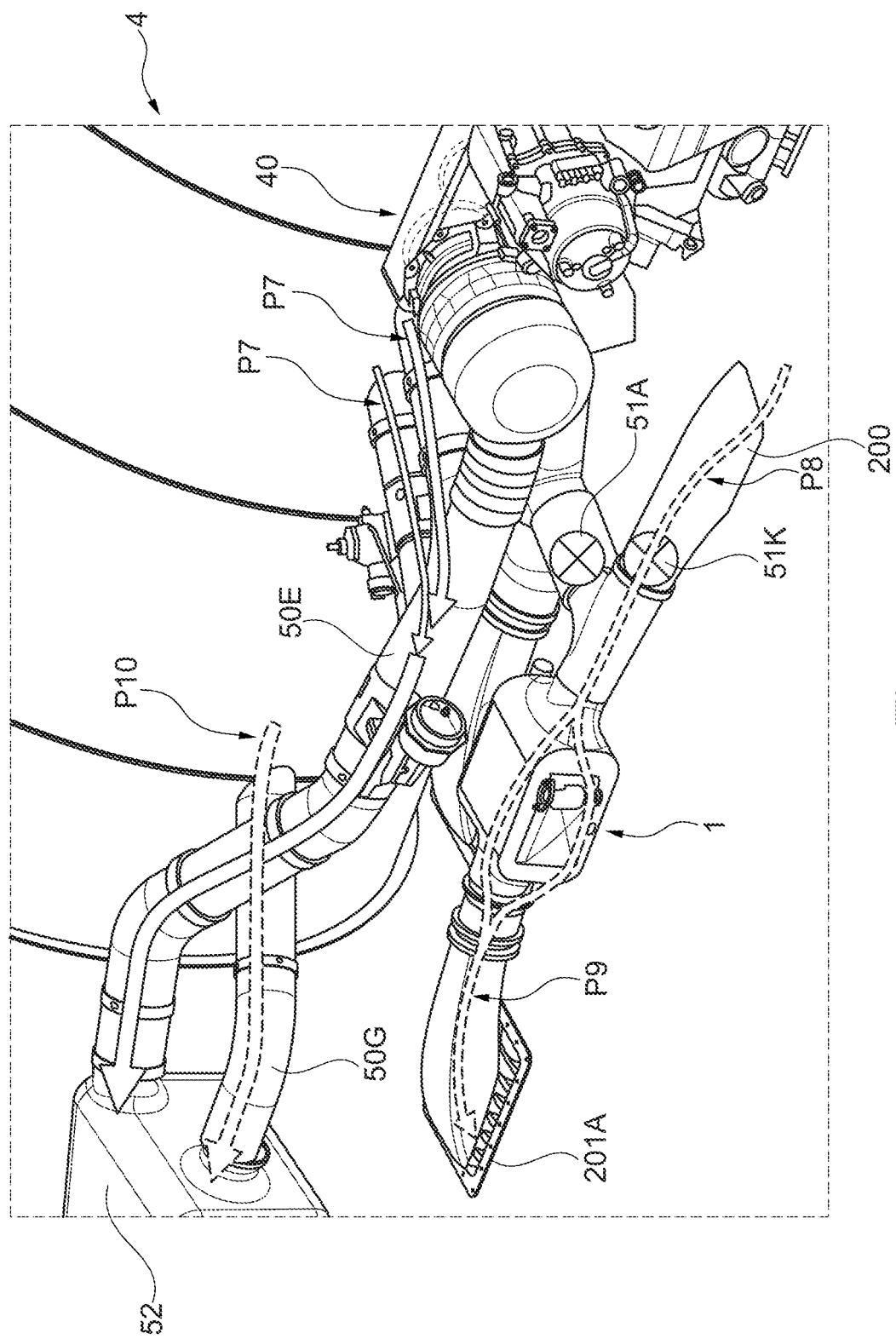
Figure 6:
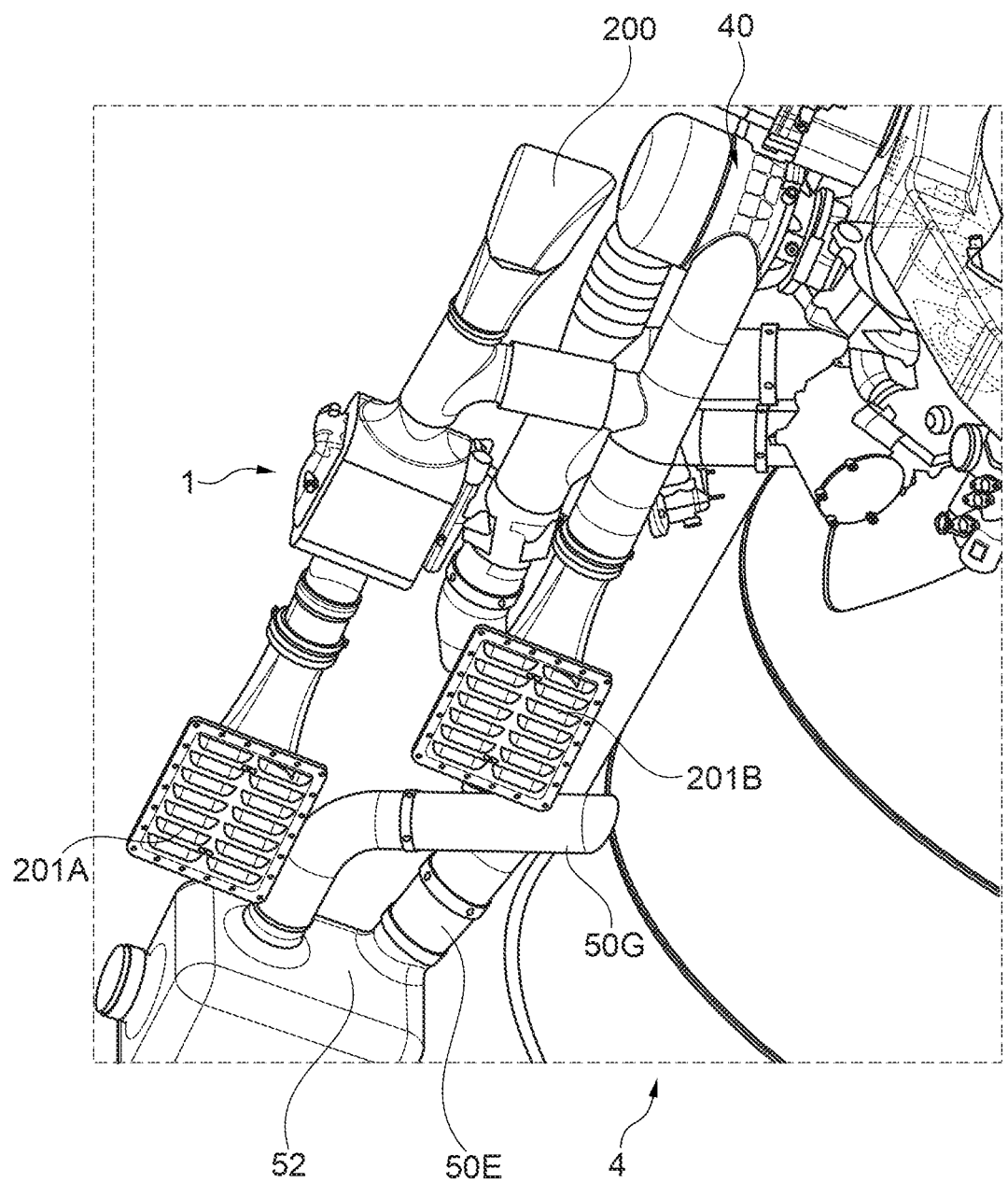
Figure 7:
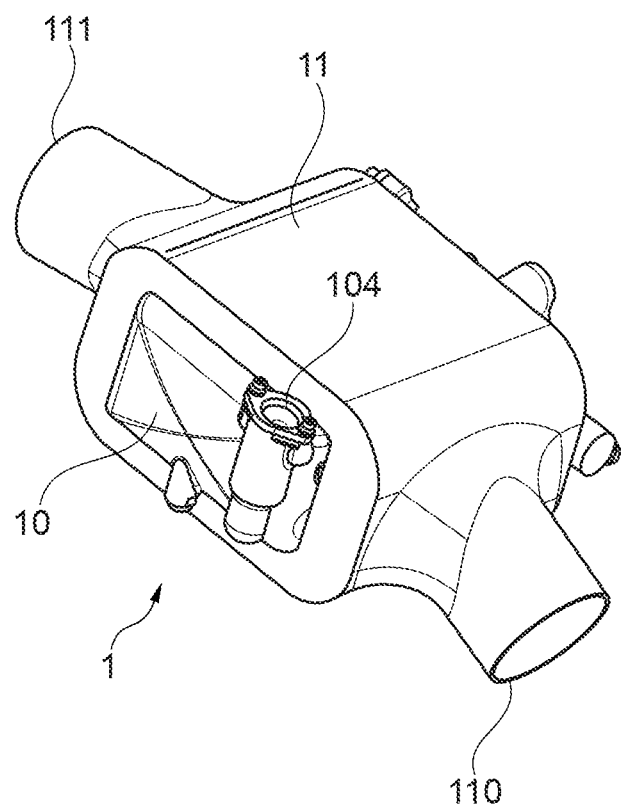
Figure 8:
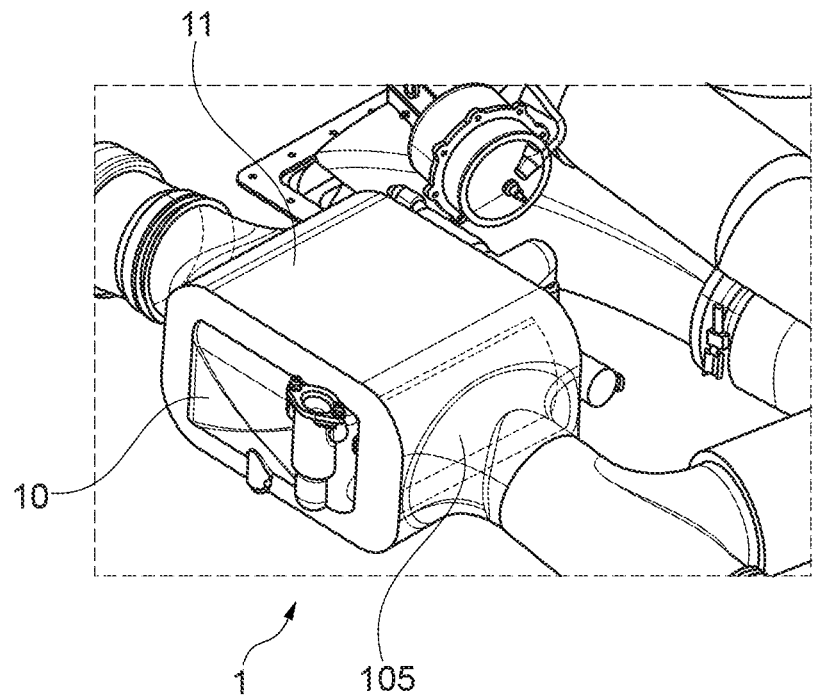
Figure 9:
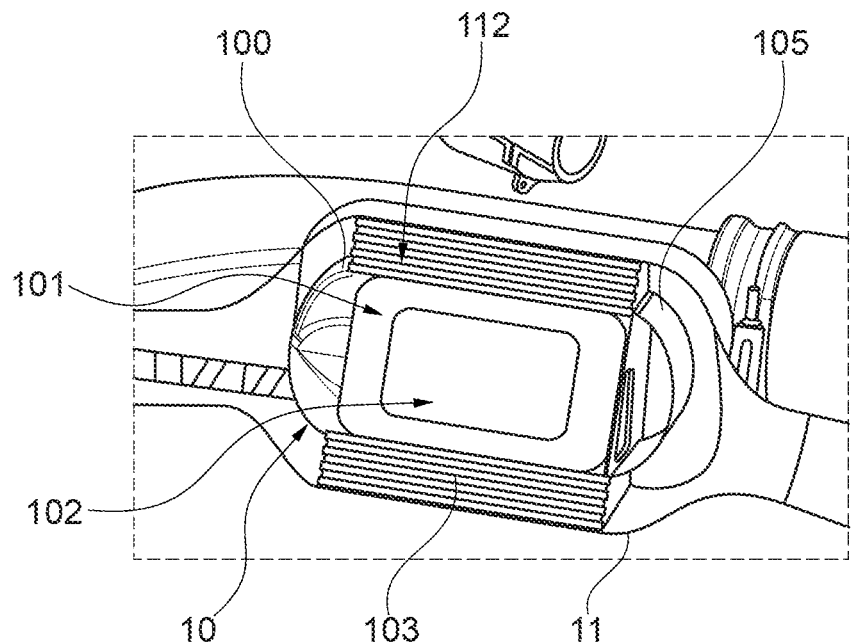

The invention is described in conjunction with the exemplary embodiments which are shown in the figures, in which:

FIG. 1 shows a diagrammatic perspective illustration of an aircraft having aircraft engines which are arranged in the region of a rear of the aircraft, FIG. 2 shows a diagrammatic illustration of a heat-exchanger device which is connected to an air turbine starter of an aircraft engine, FIG. 3 shows a diagrammatic illustration of an aircraft engine and an engine pylon with a heat-exchanger device which is arranged in the engine pylon, FIG. 4 shows a diagrammatic illustration of an aircraft engine and an engine pylon with a heat-exchanger device which is arranged in the engine pylon, in a view from above, air flows in a starting phase of the aircraft engine being shown, FIG. 5 shows the illustration in a view in accordance with FIG. 4, air flows in a warm-up operating phase of the aircraft engine, for example during a flight, being shown, FIG. 6 shows a diagrammatic perspective illustration of the aircraft engine, the engine pylon and the heat-exchanger device in accordance with FIGS. 4 and 5 in a view from below, FIG. 7 shows a diagrammatic perspective detailed view of the heat-exchanger device in accordance with FIGS. 4 to 6, FIG. 8 shows a diagrammatic detailed view of the heat-exchanger device according to FIGS. 4 to 7 which is connected to pipelines, FIG. 9 shows a diagrammatic cross-sectional illustration of the connected heat-exchanger device in accordance with FIGS. 4 to 8, FIG. 10A-10D show different diagrammatic, perspective views of a fuel-oil heat exchanger for the heat-exchanger device in accordance with FIG. 2, FIG. 3 or in accordance with FIGS. 4 to 9, and FIG. 10E-10H show different diagrammatic cross-sectional views of the fuel-oil heat exchanger in accordance with FIGS. 10A to 10D.

FIG. 1 shows an aircraft 3 having a plurality of aircraft engines 4, by means of which the aircraft 3 can be driven. In the present case, the aircraft 3 comprises two aircraft engines 4 which are fastened to the aircraft 3 in each case by means of an engine pylon 2. Furthermore, the aircraft 3 comprises an optional auxiliary engine 32 which is arranged centrally on the rear of the aircraft 3.

The two aircraft engines 4 which are fastened to the aircraft 3 in each case by means of an engine pylon 2 are mounted on opposite sides of the aircraft 3 on a fuselage 30 of the aircraft 3, in the present case in the region of the rear of the aircraft 3. As an alternative or in addition, aircraft engines 4 can also be mounted on wings 31 of the aircraft by means of an engine pylon 2.

In the present case, the aircraft engines 4 are configured as jet engines, specifically as gas turbines.

FIG. 2 shows a system with one embodiment of a heat-exchanger device 1 which is connected via a pipe line 50A to an air turbine starter 40 of one of the aircraft engines 4 of the aircraft 3 in accordance with FIG. 1.

The heat-exchanger device 1 comprises a fuel-oil heat exchanger 10, in the present case in the form of a fuel-cooled oil cooler (FCOC). The fuel-oil heat exchanger 10 has an inlet and an outlet for oil and an inlet and an outlet for fuel which are not shown in the diagrammatic illustration of FIG. 2 but will be described in greater detail in conjunction with the following figures. The inlet and the outlet for oil of the fuel-oil heat exchanger 10 are connected to an oil tank 42. By means of a pump, oil can be removed from the oil tank 42 and can be fed to the fuel-oil heat exchanger 10 which cools or heats the oil. The cooled or heated oil can be returned into the oil tank 42 again.

The oil can firstly be temperature-controlled, in particular can be cooled, by means of the fuel. The fuel is stored as a rule in the wings in the aircraft, where it is cooled by way of the ambient air depending on the flight altitude. Conversely, the oil can heat the fuel.

Furthermore, the oil can be temperature-controlled, in particular can be heated, by means of air from the air turbine starter 40. To this end, the fuel-oil heat exchanger 10 is arranged within a housing 11. The housing 11 comprises an air inlet 110 and an air outlet 111. Air which is fed in through the air inlet 110 flows along an air flow path arrangement 112 which defines at least one flow path for the air, to the air outlet 111. Via the air outlet 111, the air is guided, for example, into what is known as zone 1 of the aircraft engine 4; as an alternative, the air outlet 111 leads to the surroundings. In the present case, the air flow path arrangement 112 is formed by way of an intermediate space between an inner side of the (outer) housing 11 of the heat-exchanger device 1 and an outer side of the fuel-oil heat exchanger 10, specifically a heat exchanger housing 100 of the fuel-oil heat exchanger 10. The heat exchanger housing 100 is manufactured, for example, from metal. The (outer) housing 11 can also be manufactured from metal.

Since the oil can therefore both be heated and cooled, one or more further heat exchangers can be dispensed with, which can considerably reduce the complexity of the system and the weight. It is a further advantage of the heat-exchanger device 1 that the fuel-oil heat exchanger 10 is shielded from the surroundings by way of the additional housing 11, with the result that the oil temperature can be controlled in a particularly satisfactory manner. As a result, in particular, adjacent components can be protected against the heat of the oil and against the potentially very hot exhaust air of the air turbine starter 40.

The air turbine starter 40 is provided with a cowling 401 which receives exhaust air of the air turbine starter 40. The cowling 401 has an air outlet 400. The air outlet 400 of the air turbine starter 40 is connected to the pipeline 50A. The pipeline 50A is connected to the air inlet 110 of the heat-exchanger device 1, with the result that air is guided from the cowling 401 of the air turbine starter 40 into the housing 11 of the heat-exchanger device 1.

The air turbine starter 40 is operatively connected to an auxiliary transmission 41 of the aircraft engine 4. The aircraft engine 4 can be started by means of the air turbine starter 40 and the auxiliary transmission 41. The air turbine starter 40 is driven, for example, by means of compressed air from the auxiliary engine 32 of the aircraft 3 in accordance with FIG. 1.

The heat-exchanger device 1 serves as a fuel-oil-air heat exchanger, which can also be denoted as an FOAHE for short.

FIG. 3 illustrates a further system with a heat-exchanger device 1. The heat-exchanger device 1 is arranged in the interior of a pylon housing 20 of an engine pylon 2, for example the engine pylon 2 in accordance with FIG. 1. The engine pylon 2 connects the aircraft engine 4 to the aircraft 3, as shown in FIG. 1, on the fuselage 30 or, as an alternative, on one of the wings 31 of the aircraft 3.

The heat-exchanger device 1 can be connected, and is connected in accordance with FIG. 3, to an oil system and a fuel system of the aircraft engine 4 via in each case one feed line and one discharge line. Said feed and discharge lines are shown in a collected manner in FIG. 3 as an oil and fuel line system 15. The oil system of the aircraft engine 4 serves, for example, to lubricate one or more bearings of the aircraft engine 4. The oil system can be a combined engine and generator oil system.

In a manner which corresponds to FIG. 2, the heat-exchanger device 1 is connected via a pipeline 50A to the air outlet 400 of the air turbine starter 40 in accordance with FIG. 3, with the result that air can be guided from the air outlet 400 of the air turbine starter 40 into the heat-exchanger device 1. Exhaust air of the heat-exchanger device 1 can be discharged into the surroundings through an air outlet opening 201A via a further pipeline 50B (which is connected to the air outlet of the heat-exchanger device 1). The air outlet opening 201A is configured, for example, in a wall of the pylon housing 20.

In contrast to the embodiment in accordance with FIG. 2, the heat-exchanger device 1 in accordance with FIG. 3 is additionally connected on the air inlet side via a pipeline 50C to an air inlet opening 200 for ambient air. In the present case, the air inlet opening 200 is configured in an outer wall of the pylon housing 20, an arrangement on an outer surface of an outer housing of the aircraft engine 4 also being possible as an alternative. The heat-exchanger device 1 can be supplied with ambient air through the air inlet opening 200 and/or with exhaust air of the air turbine starter 40. In order to control from which of said sources air, in particular which quantity of air, is guided into the heat-exchanger device 1, an adjustable valve 51A is arranged in the interior of the pipeline 50A between the air turbine starter 40 and the heat-exchanger device 1. Depending on the setting of said valve 51A, greater or smaller quantities of air (or no air at all) can be provided by the air turbine starter 40 to the heat-exchanger device 1.

As can be seen in FIG. 3, a branch is provided downstream of the air outlet 400 of the air turbine starter 40, with the result that air from the air turbine starter 40 can also escape along a pipeline 50D which branches off from the pipeline 50A to the heat-exchanger device 1. Said pipeline 50D leads to an air outlet opening 201B to the surroundings. Said air outlet opening is provided in the outer wall of the pylon housing 20.

The air inlet 402 of the air turbine starter 40 is connected to a high pressure compressor 43 of the aircraft engine 4, in the present case by means of a pipeline with multiple branches, to which reference is made here in a collected manner as pipeline 50E. The pipeline 50E has a section which is connected to the high pressure compressor 43 (or generally a compressor of the aircraft engine 4) and has a check valve 51D, and a section which runs parallel to this and has an adjustable valve 51E. Said two sections are combined downstream of the valves 51D, 51E. A branch of the pipeline 50E which is connected to the high pressure compressor 43 (or generally a compressor of the aircraft engine 4) leads to the air inlet 402 of the air turbine starter 40, in the present case via an adjustable valve 51C. The air turbine starter 40 is configured to drive the auxiliary transmission 41, in order to start the engine 4. The auxiliary transmission 41 is coupled to a shaft of the high pressure compressor 43 (or generally to a shaft of a compressor of the aircraft engine 4). The auxiliary transmission 41 can thus drive the shaft in order to start the aircraft engine 4. During operation of the aircraft engine 4, the auxiliary transmission 41 can be driven by way of the aircraft engine 4, for example in order to generate electric current by means of a generator 45 (for example, in the form of what is known as an integrated drive generator, or IDG for short). A further branch of the pipeline 50E leads (via a further adjustable valve 51F) to a precooler 52 which will be described in greater detail further below. As an alternative or in addition to the connection to the high pressure compressor 43 (or generally to a compressor of the aircraft engine 4), the air inlet 402 of the air turbine starter 40 can be connected to the auxiliary engine 32 or another aircraft engine 4 of the aircraft.

The precooler 52 provides air at an adjustable temperature and an adjustable pressure to the aircraft 3. To this end, the precooler 52 is connected in the present case via a pipeline 50F to an atmospheric control unit 34 (also called an environmental control unit, or ECU for short). The latter is in turn connected via at least one adjustable valve 51H to a cabin 33 of the aircraft 3. The cabin 33 is, for example, a cabin for passengers. The cabin 33 is climate controlled and kept at a predefined air pressure by means of the precooler 52 and the atmospheric control unit 34. Exhaust air from the cabin 33 can be discharged to the surroundings via an adjustable valve 51J.

The precooler 52 is optionally connected to the auxiliary engine 32 and/or another aircraft engine 4 of the aircraft 3. To this end, for example, the pipeline 50F has a branch between the precooler 52 and the atmospheric control unit 34 to a pipeline 50J which leads to there.

As has already been mentioned, the precooler 52 is connected via the adjustable valve 51F to the high pressure compressor 43, with the result that warm air can be provided selectively to the precooler 52. Furthermore, the precooler 52 has an inlet for (cold) air. In the example in accordance with FIG. 32, said inlet is connected via a pipeline 50G to the air inlet opening 200 on the engine pylon 20, in the present case via a branch to the pipeline 50C between the air inlet opening 200 and the heat-exchanger device 1. As an alternative, said inlet of the precooler 52 might also be supplied with ambient air via a separate air inlet opening and/or by way of a connector to a turbofan duct 44 of the aircraft engine 4.

Furthermore, the precooler 52 has an air outlet which is connected via a pipeline 50H to an air outlet opening 201C, through which air can be output to the surroundings. The pipeline 50H is provided with an adjustable valve 51G which can set a throughflow rate of air through the air outlet of the precooler 52. As an alternative, the pipeline 50H from the air outlet of the precooler 52 might also open into the same air outlet opening 201A which is also connected to the heat-exchanger device 1. As an alternative or in addition, the pipelines 50B and 50D which lead from the heat-exchanger device 1 and the air turbine starter 40 to separate air passage openings 201A and 201B might be combined and might lead to the outside through a common air outlet opening.

At least one valve, in particular all the (adjustable) valves 51A-51C, 51E-51J are operatively connected to a control system 14, for example by way of electric lines, that is to say can be adjusted by means of the control system 14. By way of corresponding setting of the valves 51A-51C, 51E-51J, the control system 14 can therefore provide air to the air turbine starter 40, the heat-exchanger device 1 and/or the cabin 33, in particular with predefined or predefinable values for pressure and/or temperature. It is thus possible, in particular, to provide a respectively optimized exchange of heat between fuel, oil and air in different operating phases of the aircraft engine 4 and/or the aircraft 3, only the heat-exchanger device 1 and the precooler 52 being necessary instead of a larger number of heat exchangers. Accordingly, the system comprising pipelines 50A-50H is of comparatively particularly simple construction.

In conjunction with FIGS. 4 to 6, different possible methods of operation of the heat-exchanger device 1 and the system having said heat-exchanger device 1 will now be described. The system which is shown in said figures corresponds to the system in accordance with FIG. 3, the precooler 52 not being connected to the air inlet opening 200 in accordance with FIGS. 4 to 6 in contrast to this, but rather being connected via the correspondingly laid pipeline 50G to the turbofan duct 44 of the aircraft engine 4. Otherwise, the system in accordance with FIGS. 4 to 6 corresponds to the system in accordance with FIG. 3, certain details not being shown again for the sake of clarity.

Here, using arrows, FIG. 4 shows the flow paths P1-P6 of air flows through the different pipelines during a start, in particular a cold start of the aircraft engine 4.

Air is provided by the auxiliary engine 32 or another aircraft engine 4, in the present example via the precooler 52. From there, air flows through the pipeline 50E along a flow path P1 to the air inlet 402 of the air turbine starter 40, and drives the air turbine starter 40.

From the air turbine starter 40, warm air flows along a flow path P2 from the air outlet 400 of the air turbine starter 40 to the pipelines 50A, 50D which are branched with one another. Part of said air flow flows via the pipeline 50D along a flow path P3 (arrow with long dashes) through the air outlet opening 201B into the surroundings. A further part of the air flow flows along a flow path P4 (arrow with short dashes) from the air turbine starter 40 to the air inlet 110 of the heat-exchanger device 1. To this end, the valve 51A which is arranged in said flow path P4 is open.

In the heat-exchanger device 1, said air flow flows around the fuel-oil heat exchanger 10 of the heat-exchanger device 1 and heats it. Through the air outlet 111 of the heat-exchanger device 1, the air flows further along a flow path P5 (arrow with short dashes) from the air outlet device 201A into the surroundings.

A further adjustable valve 51K between the air inlet opening 200 and the air inlet 110 of the heat-exchanger device 1 is closed, with the result that a possible air flow along a flow path P6 from the air inlet opening 200 to the heat-exchanger device 1 is blocked.

As a result, the oil which is still cold and viscous during starting of the aircraft engine is heated by way of the warm air from the air turbine starter 40. As a result, it becomes thinner and can be guided more easily into the bearings of the aircraft engine 4.

Using arrows, FIG. 5 shows the flow paths P7-P10 of air flows through the different pipelines during regular operation of the aircraft engine 4, for example during a flight of the aircraft 3, after the aircraft engine 4 and/or the oil have/has reached their/its operating temperature.

The valve 51A between the air turbine starter 40 and the heat-exchanger device 1 is closed, with the result that no air flows through the pipeline 50A from the air turbine starter 40 to the heat-exchanger device 1. Hot air from the compressor, for example the high pressure compressor 43 of the aircraft engine 4, flows along a flow path P7 through the branched pipeline 50E towards the precooler 52 and can be provided from there to the atmospheric control unit 34.

The valve 51K between the air inlet opening 200 on the engine pylon 2 and the air inlet 110 of the heat-exchanger device 1 is open, with the result that (cold) ambient air is released along a flow path P8 from the air inlet opening 200 to the heat-exchanger device 1. Said air flow flows into the heat-exchanger device 1 and flows around the fuel-oil heat exchanger 10 therein. In this way, the oil (which is hot during operation) is cooled in the heat-exchanger device 1 by means of the (cold) ambient air. From the air outlet 111 of the heat-exchanger device 1, the air flows along a flow path P9 through the air outlet opening 201A into the surroundings.

Along a further flow path P10, (cold) air flows from the turbofan duct 44 through the pipeline 50G to the precooler 52.

FIGS. 7 to 9 show the heat-exchanger device 1 from FIGS. 4 to 6 in detail. The heat-exchanger device 1 can also be used in the systems according to FIGS. 2 and 3.

The fuel-oil heat exchanger 10 is enclosed on four sides by way of the housing 11. The fuel-oil heat exchanger 10 comprises a heat exchanger housing 100. A spacing is configured between the heat exchanger housing 100 of the fuel-oil heat exchanger 10 and the housing 11 on at least two (opposite) sides of the heat exchanger housing 100. Said spacings in each case form a flow path for air which flows from the air inlet 110 to the air outlet 111 of the heat-exchanger device 1. The flow paths (as an alternative, at least one flow path) together form an air flow path arrangement 112.

The air inlet 110 and the air outlet 111 in each case have a connector piece or interface for connecting to the pipelines 50B, 50C.

The fuel-oil heat exchanger 10 is arranged between the air inlet 110 and the air outlet 111. The air inlet 110 and the air outlet 111 of the housing 11 are arranged on opposite sides of the housing 11. Air which flows from the air inlet 110 to the air outlet 111 flows around the fuel-oil heat exchanger 10. The heat-exchanger device 1 therefore comprises a surface air cooler within the housing 11 (in an encapsulated manner). On its side which faces the air inlet 110, a guide plate 105 (curved in the present case) is arranged which guides air around the fuel-oil heat exchanger 10.

As illustrated in FIG. 9, in particular, the fuel-oil heat exchanger 10 comprises a fuel flow path arrangement 102 for fuel which is enclosed by an oil flow path arrangement 101 (on at least four sides in the present case). The oil flow path arrangement 101 is in turn enclosed by the air flow path arrangement 112 (on two sides in the present case). The fuel flow path arrangement 102 and the oil flow path arrangement 101 are arranged coaxially with respect to one another at least in sections. It can be provided, in particular, that the fuel flow path arrangement 102, the oil flow path arrangement 101 and the air flow path arrangement 112 are arranged coaxially with respect to one another at least in sections. The fuel flow path arrangement 102 forms an inner core of the heat-exchanger device 1.

For an exchange of heat which is as satisfactory as possible, cooling fins 103 which in the present case project in each case perpendicularly from the heat exchanger housing 100 are attached to the heat exchanger housing 100 in the interior of the housing 11. Air which flows from the air inlet 110 to the air outlet 111 flows along the cooling fins 103.

Air in the air flow path arrangement 112 can therefore heat or cool oil in the oil flow path arrangement 101. Oil in the oil flow path arrangement 101 can heat or cool fuel in the fuel flow path arrangement 102. As a result, the fuel can be brought to a temperature which is such that it is warm enough for an effective combustion. At excessively high temperatures, for example above 120° C., the fuel or certain constituent parts of the fuel can decompose, however, as a result of which valves might be clogged. By means of the heat-exchanger device 1 (for example, by way of a corresponding regulation by means of the control system 14), the fuel can be both cooled and heated as required, in order to set an optimum temperature. This is possible because all of the fuel flow path arrangement 102, the oil flow path arrangement 101 and the air flow path arrangement 112 are integrated into a common device (in particular, are accommodated in the same housing 11).

FIGS. 10A to 10H show different views of one possible embodiment of a fuel-oil heat exchanger 10 for the above-described heat-exchanger device 1 in detail.

A fuel inlet 16A for the introduction of fuel is provided on the fuel-oil heat exchanger 10, which fuel inlet 16A is connected fluidically to a fuel outlet 16B. Furthermore, an oil inlet 17A for the introduction of oil is provided, which oil inlet 17A is connected fluidically to an oil outlet 17B. The fuel inlets and outlets 16A, 16B and the oil inlets and outlets 17A, 17B can be connected to the oil and fuel line system 15 (see FIG. 3).

A fuel bypass connector 106A is connected via a bypass valve to the fuel flow path arrangement 102, in order to discharge fuel in the case of a possible overpressure. If, for example, there is a water content in the fuel, which water content freezes at low temperatures, (non-heated) fuel can nevertheless be provided to a combustion chamber of the aircraft engine 4 by the fuel bypass connector 106A.

An oil bypass connector 106B is connected via a bypass valve to the oil flow path arrangement 101, in order to discharge oil in the case of a possible overpressure. As required, the oil bypass connector 106B can also be arranged rotated by 90° with respect to the orientation which is shown, for example, in FIG. 10B, as shown in FIG. 4, for example.

Furthermore, the fuel-oil heat exchanger 10 comprises a plurality of, in the present case two temperature sensor connectors 108, on which in each case one temperature sensor 18 (shown diagrammatically in FIG. 100) can be mounted. In each case one of the temperature sensor connectors 108 allows the detection of the oil temperature or the fuel temperature. The temperature sensors 18 can be coupled to the control system 14, with the result that the control system 14 can regulate the temperature of the oil and/or the fuel by way of adjustment of the valves. As an alternative or in addition, one or more temperature sensors 18 can also be attached at different locations, for example to pipe connections or hose connections, to a tank of the respective fluid or to the aircraft engine 4.

Figure 10A:
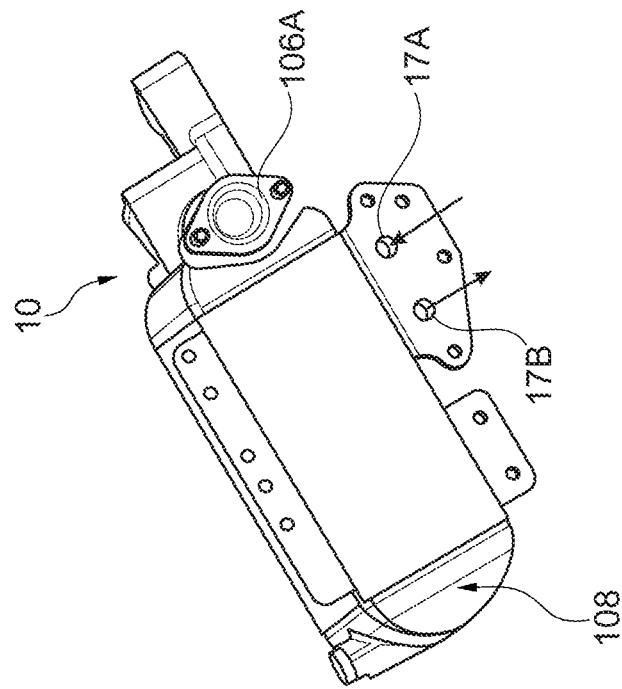
Figure 10B:
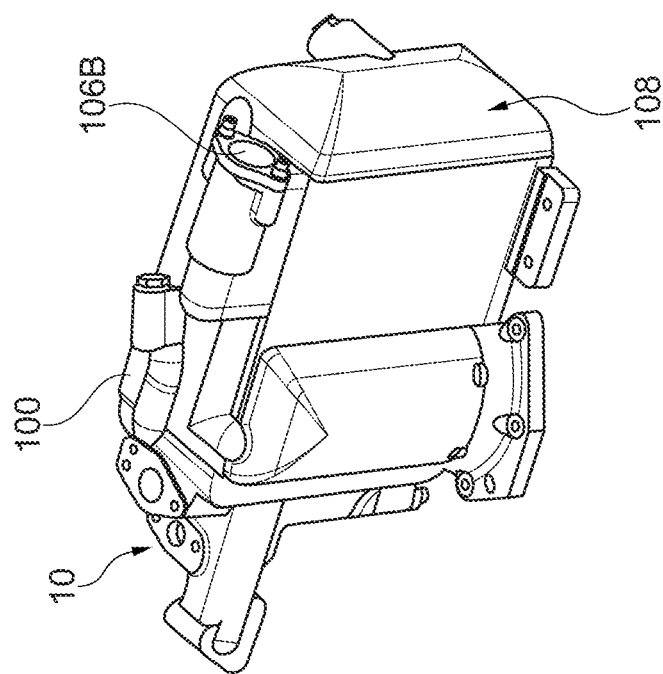
Figure 10C:
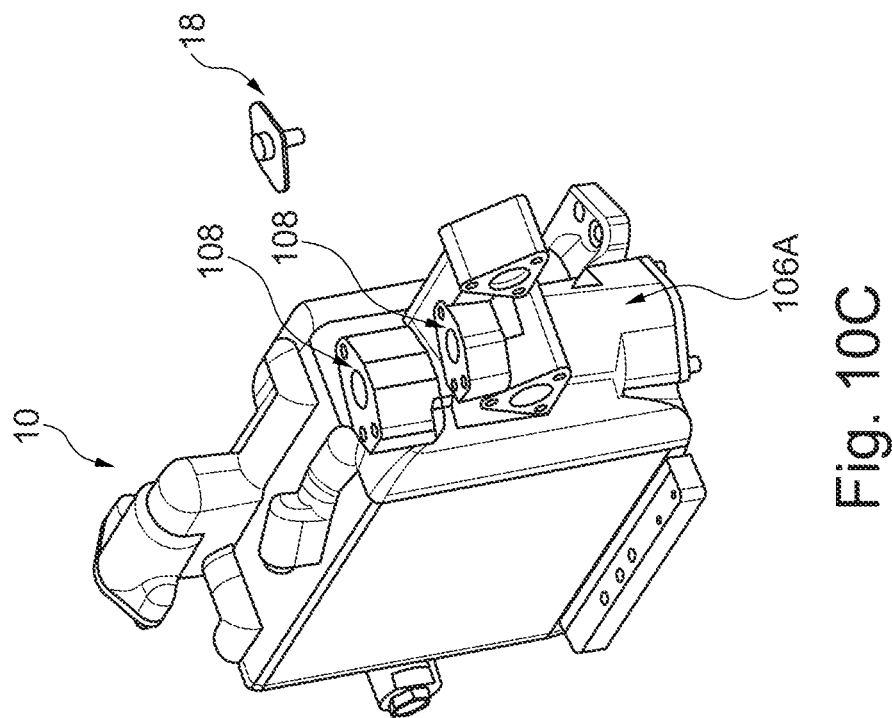
Figure 10D:
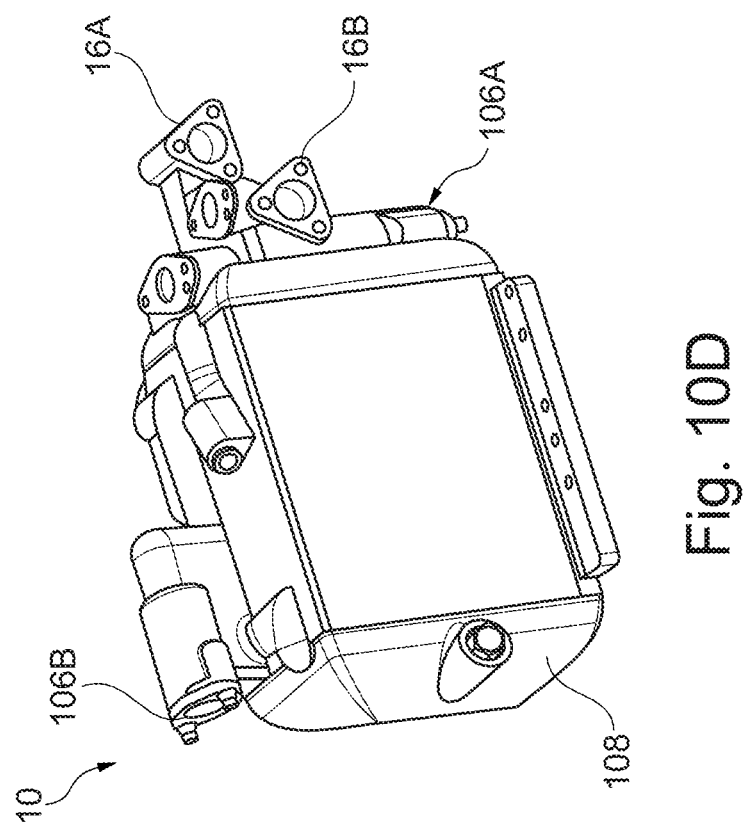
Figure 10E:
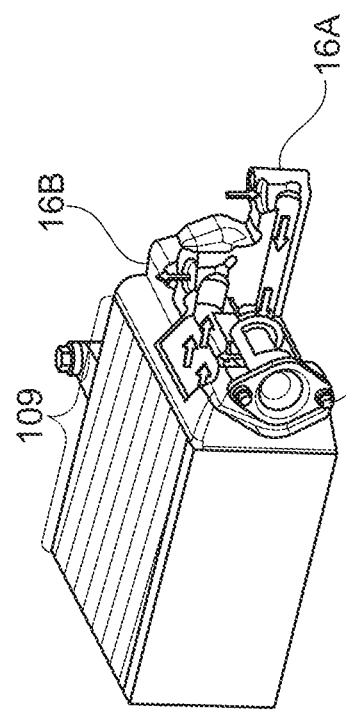
Figure 10F:
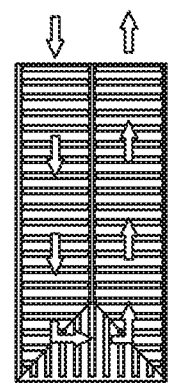
Figure 10G:
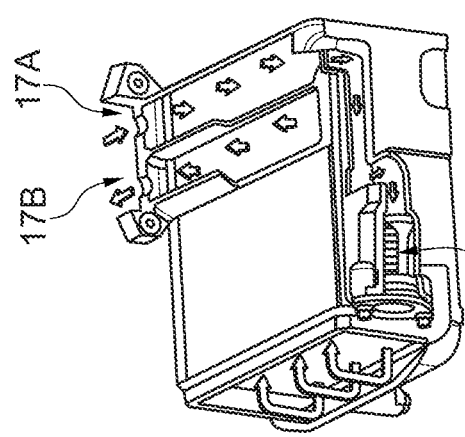
Figure 10H:
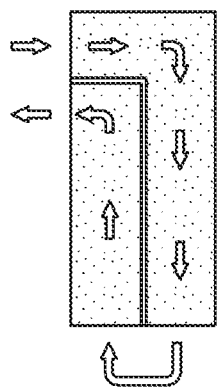

An oil return cap 108 is part of the heat-exchanger housing 100. The oil return cap 108 is of convex configuration and serves to return the oil within a cooler matrix 109 of the fuel-oil heat exchanger 10, as illustrated using arrows, in particular, using FIGS. 10G and 10H, which arrows show the oil flow through the cooler matrix 109. FIGS. 10E and 10F likewise represent the fuel flow through the cooler matrix 109 using arrows. In the example which is shown, the fuel-oil heat exchanger 10 is configured in such a way that oil and fuel flow past one another in opposite directions.

In the present case, the term pipeline is used in each case for the different air routing means. It goes without saying, however, that any other suitable, air-routing connection can also be used, for example hoses, etc.

LIST OF REFERENCE NUMERALS

1 Heat-exchanger device
10 Fuel-oil heat exchanger
100 Heat exchanger housing
101 Oil flow path arrangement
102 Fuel flow path arrangement
103 Cooling fins
104 Bypass outlet
105 Guide plate
106A Fuel bypass connector
106B Oil bypass connector
107 Oil return cap
108 Temperature sensor connector
109 Cooler matrix
11 Housing
110 Air inlet
111 Air outlet
112 Air flow path arrangement
14 Control system
15 Oil and fuel line system
16A Fuel inlet
16B Fuel outlet
17A Oil inlet
17B Oil outlet
18 Temperature sensor
2 Engine pylon
20 Pylon housing
200 Air inlet opening
201A-201C Air outlet opening
3 Aircraft
30 Fuselage
31 Wing
32 Auxiliary engine
33 Cabin
34 Atmospheric control unit
4 Aircraft engine
40 Air turbine starter
400 Air outlet
401 Cowling
402 Air inlet
41 Auxiliary transmission
42 Oil tank
43 High pressure compressor
44 Turbofan duct
45 Generator
50A-50J Pipeline
51A-51J Valve
52 Precooler
P1-P10 Flow path

The invention claimed is:

1. A heat-exchanger device for an aircraft engine, comprising:
a fuel-oil heat exchanger for exchanging heat between fuel and oil:
a housing including an air inlet and an air outlet; and
wherein fuel-oil heat exchanger is arranged at least partially within the housing such that air flowing from the air inlet to the air outlet flows over or around the fuel-oil heat exchanger,
wherein the aircraft engine includes an air turbine starter for starting the aircraft engine, wherein the air turbine starter includes an air turbine starter air outlet, and wherein the air inlet of the heat-exchanger device is connected to the air turbine starter air outlet.

2. The heat-exchanger device according to claim 1, wherein the fuel-oil heat exchanger is arranged between the air inlet and the air outlet.

3. The heat-exchanger device according to claim 1, wherein the fuel-oil heat exchanger further comprises an oil flow path arrangement and a fuel flow path arrangement.

4. The heat-exchanger device according to claim 3, wherein heat is exchanged between oil flowing through the oil flow path arrangement and fuel flowing through the fuel flow path arrangement.

5. The heat-exchanger device according to claim 3, wherein the fuel-oil heat exchanger further comprises an air flow path arrangement, wherein the air inlet is connected to the air outlet by way of the air flow path arrangement, and wherein the air flow path arrangement at least partially surrounds the oil flow path arrangement.

6. The heat-exchanger device according to claim 3, wherein the oil flow path arrangement at least partially surrounds the fuel flow path arrangement.

7. The heat-exchanger device according to claim 3, wherein the fuel-oil heat exchanger further comprises a heat exchanger housing in which the oil flow path arrangement and the fuel flow path arrangement are housed, and wherein the heat exchanger housing is arranged at least partially within the housing.

8. The heat-exchanger device according to claim 1, wherein the fuel-oil heat exchanger comprises cooling fins, and wherein air flowing from the air inlet to the air outlet flows around the cooling fins.

9. The heat-exchanger device according claim 1, comprising at least one valve for controlling air flow through the air inlet.

10. The heat-exchanger device according to claim 1, wherein the aircraft engine includes an engine pylon, wherein the aircraft engine is fastened to an aircraft via the engine pylon, and wherein the heat-exchanger device is arranged at one chosen from on and in the engine pylon.

11. The heat-exchanger device according to claim 1, further comprising at least one valve, wherein the at least one valve is controlled to selectively guide at least one chosen from air from the air turbine starter air outlet and external air to the air inlet of the heat-exchanger device.

12. A method for operating an aircraft engine, comprising:
providing a heat exchanger device, comprising:
a fuel-oil heat exchanger for exchanging heat between fuel and oil;
a housing including an air inlet and an air outlet; and
wherein the fuel-oil heat exchanger is arranged at least partially within the housing such that air flowing from the air inlet to the air outlet flows over or around the fuel-oil heat exchanger; and
supplying oil and fuel to the aircraft engine with the heat exchanger device,
providing the heat-exchanger device including an air turbine starter air outlet and at least one valve;
controlling the at least one valve in such a way that, in a cold starting phase of the aircraft engine, air is guided from the air turbine starter air outlet to the air inlet of the heat-exchanger device, in order to heat the oil, and, during a warm-up operating phase of the aircraft engine, external air is guided to the air inlet of the heat-exchanger device to cool the oil.

\* \* \* \* \*